United States Patent
Vairavakkalai (10) Patent No.: US 9,137,142 B2
(45) Date of Patent: Sep. 15, 2015

(54) REDUCED TRAFFIC LOSS FOR BORDER GATEWAY PROTOCOL SESSIONS IN MULTI-HOMED NETWORK CONNECTIONS

(75) Inventor: Kaliraj Vairavakkalai, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 157 days.

(21) Appl. No.: 13/436,896

(22) Filed: Mar. 31, 2012

(65) Prior Publication Data

US 2013/0259058 A1    Oct. 3, 2013

(51) Int. Cl.
H04L 12/56 (2006.01)
H04L 12/757 (2013.01)
H04L 12/715 (2013.01)

(52) U.S. Cl.
CPC .............. H04L 45/023 (2013.01); H04L 45/04 (2013.01)

(58) Field of Classification Search
CPC ....................................................... H04L 12/56
USPC ......... 370/401, 254, 400, 395.31, 395.3, 351, 370/392; 709/237, 238, 242
See application file for complete search history.

(56) References Cited

U.S. PATENT DOCUMENTS

| | | | |
|---|---|---|---|
| 6,704,795 B1 * | 3/2004 | Fernando et al. ............. | 709/237 |
| 7,406,030 B1 * | 7/2008 | Rijsman ........................ | 370/216 |
| 7,417,947 B1 * | 8/2008 | Marques et al. ............... | 370/220 |
| 7,616,638 B2 * | 11/2009 | Samuels et al. ............... | 370/394 |
| 7,647,426 B2 * | 1/2010 | Patel et al. .................... | 709/239 |
| 7,787,365 B1 * | 8/2010 | Marques et al. ............... | 370/220 |
| 7,948,870 B1 * | 5/2011 | Rijsman ........................ | 370/216 |
| 7,986,695 B1 * | 7/2011 | Kodeboyina et al. ......... | 370/392 |
| 8,542,612 B1 * | 9/2013 | Uttaro ........................... | 370/255 |
| 2003/0142682 A1 * | 7/2003 | Bressoud et al. ............. | 370/401 |
| 2005/0174989 A1 * | 8/2005 | Chen et al. .................... | 370/351 |
| 2005/0286412 A1 * | 12/2005 | Hao et al. ...................... | 370/216 |
| 2006/0092940 A1 * | 5/2006 | Ansari et al. .................. | 370/392 |
| 2006/0126665 A1 * | 6/2006 | Ward et al. .................... | 370/474 |
| 2006/0193247 A1 * | 8/2006 | Naseh et al. .................. | 370/216 |
| 2006/0221866 A1 * | 10/2006 | Shepherd ....................... | 370/255 |
| 2006/0233181 A1 * | 10/2006 | Raszuk et al. ................ | 370/401 |
| 2006/0233182 A1 * | 10/2006 | Appanna et al. .............. | 370/401 |
| 2006/0268681 A1 | 11/2006 | Raza | |
| 2007/0064690 A1 * | 3/2007 | Karpagavinayagam ...... | 370/389 |

(Continued)

OTHER PUBLICATIONS

U.S. Appl. No. 13/194,571, by Scott Mackie, filed Jul. 29, 2011.

(Continued)

Primary Examiner — Parth Patel
(74) Attorney, Agent, or Firm — Shumaker & Sieffert, P.A.

(57) ABSTRACT

This disclosure describes techniques to reduce traffic loss for a Border Gateway Protocol (BGP) session by delaying re-advertisement of routes received from a newly re-established multi-homed router by a primary router until all the routes are installed in a forwarding plane of the primary router. The techniques of this disclosure make use of a BGP marker received from the multi-homed router that indicates the end of a route download for an address family. Upon receiving the BGP marker, a control plane of the primary router requests a route acknowledgement message (Route-ACK) from the forwarding plane for only the last route of the address family received before the BGP marker. When the control plane receives the Route-ACK indicating that the last route has been installed in the forwarding plane, the primary router initiates re-advertisement of the routes to other BGP peer routers.

23 Claims, 4 Drawing Sheets

(56) References Cited

U.S. PATENT DOCUMENTS

| | | | |
|---|---|---|---|
| 2008/0031257 A1* | 2/2008 | He | 370/395.31 |
| 2008/0062891 A1* | 3/2008 | Van der Merwe et al. | 370/254 |
| 2008/0075088 A1* | 3/2008 | Carrasco | 370/395.5 |
| 2008/0186877 A1* | 8/2008 | Balonado et al. | 370/254 |
| 2010/0008361 A1* | 1/2010 | Guichard et al. | 370/392 |
| 2010/0080131 A1 | 4/2010 | Ward et al. | |
| 2011/0032945 A1 | 2/2011 | Mullooly et al. | |
| 2012/0218936 A1* | 8/2012 | Fleeman et al. | 370/316 |
| 2012/0269198 A1* | 10/2012 | Patel et al. | 370/400 |
| 2013/0077528 A1* | 3/2013 | Visser | 370/255 |
| 2013/0163600 A1* | 6/2013 | Aguilar et al. | 370/395.5 |

OTHER PUBLICATIONS

Dong et al., "BGP End-of RIB Usage Extension and Negotiation," draft-dong-idr-end-of-rib-use-extension-00, Network Working Group, Internet-Draft, Jul. 4, 2011, 7 pp.

Kothari et al, "BGP based Multi-homing in Virtual Private LAN Service," draft-ietf-l2vpn-vpls-multihoming-03.txt, Network Working Group, Internet-Draft, Jul. 6, 2011, 26 pp.

Rekhter et al., "A Border Gateway Protocol 4 (BGP-4)," Network Working Group, Requests for Comments: 4271, Jan. 2006, 105 pp.

Sangli et al., "Graceful Restart Mechanism for BGP," Network Working Group, Request for Comments: 4724, Jan. 2007, 16 pp.

Kompella et al., "Virtual Private LAN Service (VPLS) Using BGP for Auto-Discovery and Signaling," Network Working Group, Requests for Comments: 4761, Jan. 2007, 29 pp.

Zimmerman, "OSI Reference Model—The ISO Model of Architecture for Open Systems Interconnection," IEEE Transactions on Communications, vol. Com-28, No. 4, Apr. 1980, pp. 425-432.

Extended European Search Report mailed Jul. 3, 2013 in corresponding EP Application No. 12198860.4, 5 pgs.

\* cited by examiner

REDUCED TRAFFIC LOSS FOR BORDER GATEWAY PROTOCOL SESSIONS IN MULTI-HOMED NETWORK CONNECTIONS

TECHNICAL FIELD

This disclosure relates to computer networks and, more particularly, to multi-homed connections in computer networks.

BACKGROUND

A computer network is a collection of interconnected network devices that can exchange data and share resources. Network devices within computer networks often include a control unit that provides control plane functionality and forwarding components for routing or switching data units. In some cases, for example, a network device may include a plurality of packet forwarding engines (PFEs) and a switch fabric that collectively provide a forwarding plane for forwarding network traffic. The control unit maintains routing information in a routing information base (RIB) that represents the overall topology of the network and defines routes to destinations within the network. The control unit derives a forwarding information base (FIB) that includes a number of forwarding data structures in accordance with the routing information. In some cases, the control unit may install the forwarding data structures into each of the PFEs to update copies of the FIB within each of the PFEs and control traffic forwarding within the forwarding plane.

As one example of a computer network, a service provider network typically provides one or more services that involve communicating data over the Internet. For customers that require high-availability in accessing either the public network or other services offered by the service provider, the customer may require a redundant connection to the service provider network. This redundant connection may involve coupling the customer's network device that resides at the edge of the customer network, such as a customer edge (CE) router, to a provider edge (PE) router of the service provider network that is different than a primary PE router to which the CE router is coupled via a primary connection. The redundant connections are typically not actively used for data transmission, but may be used as a backup forwarder in the event of a network failure that would preclude the primary PE router from sending the data. As a result, the primary connection may be referred to as the active connection while the redundant connection may be referred to as the non-active or backup connection. Having multiple connections between the CE router and the PE routers may commonly be referred to as "multi-homing."

SUMMARY

In general, this disclosure describes techniques to reduce traffic loss for Border Gateway Protocol (BGP) sessions by delaying re-advertisement of routes received from a newly re-established multi-homed router at a control plane of a primary router until all the routes are installed in a forwarding plane of the primary router. In the case where the multi-homed router is connected to the primary router and a backup router via a multi-homed network connection, traffic may continue to reach the multi-homed router via backup forwarding path through the backup router during the re-advertisement delay at the primary router. In this way, the techniques avoid traffic loss, i.e., "black-holing," in which the primary router receives traffic on the received routes before the routes have been fully installed in the forwarding plane of the primary router.

The traffic black-holing issue may be solved by implementing route acknowledgement messages (Route-ACKs) between packet forwarding engines (PFEs) in the forwarding plane and a routing engine in a control plane of the primary router when each of the routes has been installed in the PFEs. Requiring Route-ACKs from each of the PFEs for each of the installed routes, however, presents a scalability issue. The techniques of this disclosure make use of a BGP marker received from the multi-homed router that indicates the end of a route download for an address family. For example, upon receiving the BGP marker, the primary router may request a Route-ACK for only the last route of the address family received before the BGP marker. When the routing engine in the primary router receives the Route-ACK indicating that the last route has been installed in the PFEs of the forwarding plane, the primary router may assume that all the previous routes have also been installed in the PFEs. The receipt of the Route-ACK for the last route at the routing engine of the primary router initiates re-advertisement of the routes received from the multi-homed router to other peer routers of the primary router.

In one example, the disclosure is directed to a method comprising receiving, with a primary router, advertised routes from a multi-homed router via a BGP session, wherein the multi-homed router is connected to the primary router and a backup router, updating, in a control plane of the primary router, routing information in a routing table based on the received routes, installing, in a forwarding plane of the primary router, forwarding data structures for the received routes in forwarding tables based on the routing information, and deferring re-advertisement of the routes to BGP peer routers until the control plane receives an acknowledgement from the forwarding plane indicating that a last route received from the multi-homed router is installed in the forwarding tables of the forwarding plane.

In another example, the disclosure is directed to a primary router in a multi-homed network connection comprising interfaces configured to receive advertised routes from the multi-homed router via a BGP session, wherein the multi-homed router is connected to the primary router and a backup router, and a control unit configured to update routing information in a routing table in a control plane of the primary router based on the received routes, install forwarding data structures for the received routes in forwarding tables in a forwarding plane of the primary router based on the routing information, and defer re-advertisement of the routes to BGP peer routers until the control plane receives an acknowledgement from the forwarding plane indicating that a last route received from the multi-homed router is installed in the forwarding tables of the forwarding plane.

In a further example, the disclosure is directed to a computer-readable medium comprising instructions that when executed cause a processor of a primary router to receive advertised routes from a multi-homed router via a BGP session, wherein the multi-homed router is connected to the primary router and a backup router, update, in a control plane of the primary router, routing information in a routing table based on the received routes, install, in a forwarding plane of the primary router, forwarding data structures for the received routes in forwarding tables based on the routing information, and defer re-advertisement of the routes to BGP peer routers until the control plane receives an acknowledgement from the forwarding plane indicating that a last route received from the multi-homed router is installed in the forwarding tables of the forwarding plane.

The details of one or more embodiments are set forth in the accompanying drawings and the description below. Other features, objects, and advantages will be apparent from the description and drawings, and from the claims.

DETAILED DESCRIPTION

Figure 1:
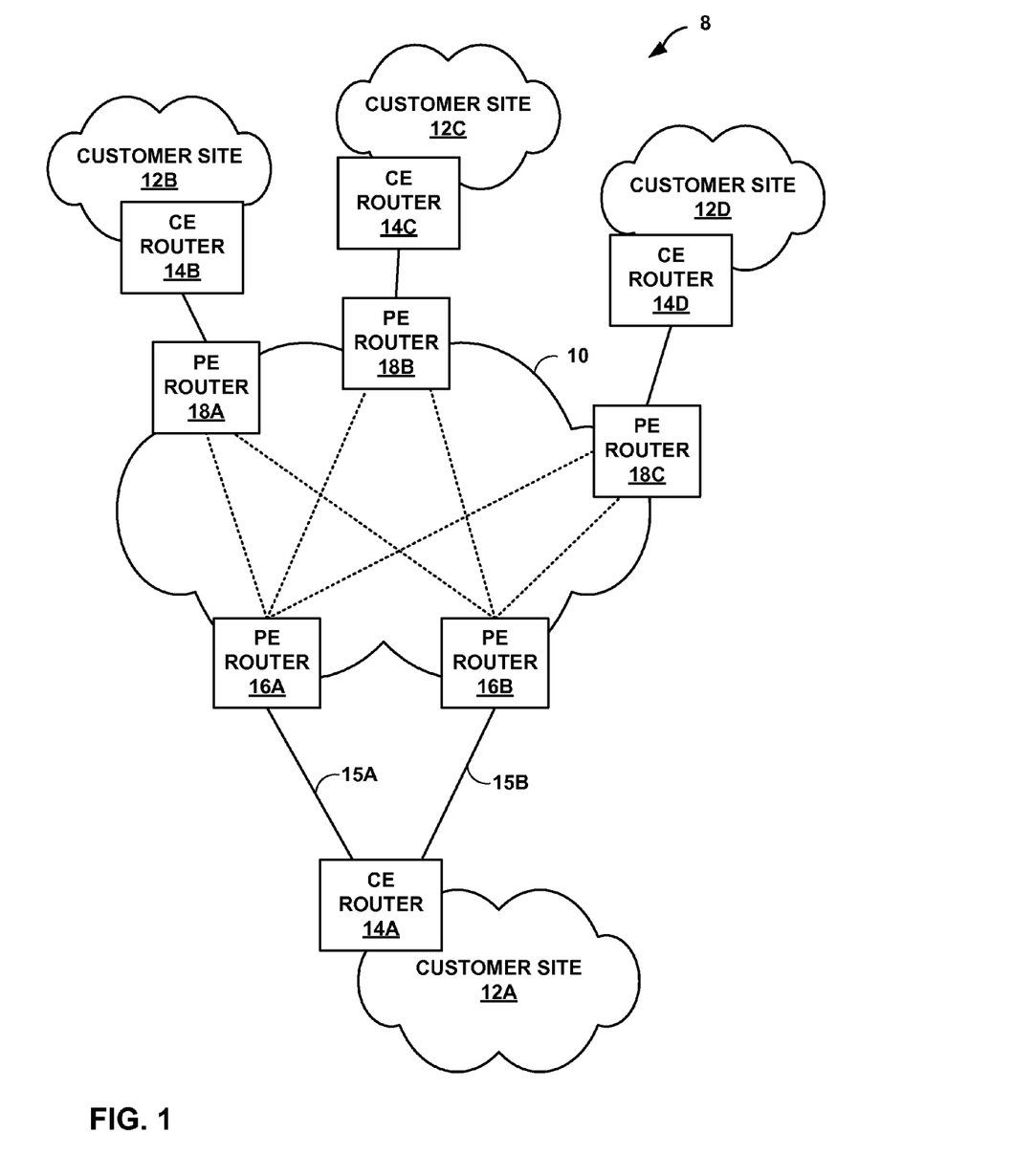
FIG. 1 is a block diagram illustrating an example network system that includes a primary router capable of performing the techniques of this disclosure to reduce traffic loss for Border Gateway Protocol (BGP) sessions in multi-homed network connections.

FIG. 1 is a block diagram illustrating an example network system 8 that includes a primary provider edge (PE) router 16A capable of performing the techniques of this disclosure to reduce traffic loss for Border Gateway Protocol (BGP) sessions on multi-homed network connections 15A-15B ("multi-homed network connections 15"). As shown in FIG. 1, network system 8 includes a service provider network 10 and customer sites 12A-12D ("customer sites 12"). Network 10 may represent a network that is owned and operated by a service provider to interconnect a plurality of edge networks, such as customer sites 12. As a result, service provider network 10 may be referred to herein as a "core network" considering that network 10 acts as a core to customer networks, such as customer sites 12.

The service providers may lease portions of network 10 or provide services offering interconnection through network 10 to customer sites 12, which may lease the portions or purchase the services provided by network 10. For example, network 10 may offer a Virtual Private Network (VPN) service to virtually interconnect various customer network sites. A VPN may transparently interconnect customer sites 12 to one another via service provider network 10. Network 10 may provide VPN service by transparently emulating a direct connection between these various customer sites 12 such that, from the perspective of customer sites 12, each of customer sites 12 appears to directly connect to one another.

Customer sites 12 may each represent a network owned and operated by a large entity, such as a university, corporation, business, or other facility or enterprise. In some instances, a single large entity may own and operate two or more of customer sites 12. The entity may then contract with service provider network 10 to purchase a service offered by service provider network 10, such as VPN, in order to transparently interconnect these customer sites 12 in the manner described above.

Each of customer sites 12 may operate according to a wide variety of network protocols, such as any of the 802.3X family of network protocols related to the Ethernet protocol, any of the 802.1X family of wireless networking protocols, an Internet Protocol (IP) protocol, and a Transmission Control Protocol (TCP). Moreover, customer sites 12 may each comprise a Virtual Private Network (VPN), a Local Area Network (LAN), or a Wide Area Network (WAN). Although not shown in the examples of FIG. 1 for ease of illustration purposes, each of customer sites 12 may include a wide variety of interconnected computing devices or nodes, such as web servers, print servers, application servers, data servers, workstations, desktop computers, laptop computers, cellular or other mobile devices, Personal Digital Assistants (PDAs), and any other device capable of connecting to a computer network via a wireless and/or wired connection.

As shown in the example of FIG. 1, service provider network 10 includes provider edge (PE) routers 16A-16B ("PE routers 16") and PE routers 18A-18C ("PE routers 18") that reside at the edge of service provider network 10. While discussed herein with respect to a particular network device, i.e., routers, PE routers 16, 18 may each represent one example of a network device that interfaces with customer sites 12 to route, switch or otherwise forward network traffic directed to and/or originating from the customer sites 12. The techniques may however be performed by any type of network device, including a switch, a hub, a bridge device (e.g., an Ethernet bridge), or any other L2 network device and/or L3 network device capable of performing L2 functionality. In addition, while shown as physically separate network devices in the example of FIG. 1, PE routers 16, 18 may reside within different chassis of what may be considered the same network device. The techniques should not therefore be limited in this respect. Additionally, the techniques may be implemented with respect to different virtual network devices, such as virtual PE routers that may be logically separate but executed on the same physical hardware.

PE routers 16, 18 may implement BGP as a control plane routing protocol to exchange routing information with peer routers located in either the same autonomous system (AS), e.g., service provider network 10, or different ASs, e.g., one or more of customer sites 12. PE outers 16, 18 that implement BGP may be referred to as "BGP speakers." A BGP session may be established between two of PE routers 16, 18 configured to be peer routers. Once the session is established, the BGP peers exchange routing information. For example, as illustrated in FIG. 1, each of PE routers 16 may be BGP peers with each of PE routers 18. PE router 16A and PE router 16B, however, may not necessarily be BGP peers with each other. PE routers 18 may comprise internal peer routers of PE routers 16. In addition, each of PE routers 16 may be BGP peers with CE router 14A in customer site 12A. CE router 14A may comprise an external peer router of PE routers 16. Additional details related to BGP can be found in Y. Rekhter, "A Border Gateway Protocol 4 (BGP-4)," Request for Comments: 4271, The IETF Trust, January 2006, which is hereby incorporated by reference in its entirety.

Customer sites 12 include customer edge (CE) routers 14A-14D ("CE routers 14"), respectively, that reside at the edges of customer sites 12. While discussed herein with respect to a particular network device, i.e., routers, CE routers 14 may represent any network device that interfaces with service provider network 10 to route, switch or otherwise forward network traffic directed to and/or originating from network 10. The techniques may however be performed by any type of network device, including a switch, a hub, a bridge device (e.g., an Ethernet bridge), or any other L2 network device and/or L3 network device. One or more of CE routers 14 may implement BGP as a routing protocol to exchange routing information with peer routers located in either the same AS, e.g., the respective one of customer sites 12, or different ASs, e.g., service provider network 10. For example, as illustrated in FIG. 1, each of PE routers 16 may be BGP peers with CE router 14A. CE router 14A may comprise an external peer router of PE routers 16.

In the example of FIG. 1, customer site 12A has a redundant connection to service provider network 10 through multiple PE routers 16A and 16B via respective links 15A and 15B, a technique which is referred to as "multi-homing." Specifically, customer site 12A, via CE router 14A, is multi-homed to network 10 through PE routers 16A and 16B. The techniques of this disclosure should not be limited to the example shown in FIG. 1, but may be implemented with respect to any form of connectivity that involves multiple connections between two or more physical network devices, such as PE routers 16 and 18, or virtual network devices.

There are a variety of different types of multi-homed connections including an active-active multi-homed connection and an active-standby multi-home connection. In an active-active multi-homed connection, all of the links forming the multi-homed connection are considered active in that each of these links may delivery data traffic between PE routers 16 and CE router 14A. In an active-standby multi-homed connection, typically one of the links is active in delivering data traffic between PE routers 16 and CE router 14A, while one of the links is standby and does not delivery data traffic between PE routers 16 and CE router 14A. It is assumed in this disclosure that PE routers 16 and CE router 14A maintain an active-standby multi-homed connection, although various aspects of the techniques are not limited to this form of multi-homed connection and may be implemented with respect to other forms of multi-homed connections, such as the active-active form of multi-homed connection.

In the active-standby link topology illustrated in FIG. 1, one of PE routers 16, e.g., PE router 16A, is chosen to be the active or primary PE router, i.e., designated forwarder, to send traffic to and from customer site 12A. The other multi-homing PE router 16, e.g., PE router 16B, is designated as a backup PE router or backup forwarder which can be used to send traffic to and from customer site 12A in the event of a network failure that would preclude primary PE router 16A from sending the traffic. In this case, a primary forwarding path through network 10 exists to send traffic from any of customer sites 12B-12D to customer site 12A via PE routers 18, primary PE router 16A, and CE router 14A. In addition, a backup forwarding path through network 10 exists between customer sites 12B-12D and customer site 12A via PE routers 18, backup PE router 16B, and CE router 14A.

In the example where the BGP session between primary PE router 16A and CE router 14A goes down, PE routers 18 will instead send traffic destined for customer site 12A along the backup forwarding path through backup PE router 16B to CE router 14A. When the BGP session between primary PE router 16A and CE router 14A is reestablished, CE router 14A advertises its routes to primary PE router 16A. For purposes of this disclosure, the term "routes" is generally used to describe forwarding information or forwarding data structures that are installed in a forwarding plane of a router to control traffic forwarding within the forwarding plane.

Upon receiving the route advertisements, a control unit within primary PE router 16A updates routing information stored in a routing information base (RIB) that represents the overall topology of network system 8 and defines routes to destinations within network system 8. After updating the RIB based on the received routes, the control unit of primary PE router 16A derives a forwarding information base (FIB) that includes a number of forwarding data structures in accordance with the routing information. The control unit then updates one or more copies of the forwarding information base (FIB) within a forwarding plane of primary PE router 16A. For example, the control unit of primary PE router 16A may install the forwarding data structures for the received routes into copies of the FIB in each of a plurality of packet forwarding engines (PFEs) within the forwarding plane.

Primary PE router 16A also re-advertises the routes received from CE router 14A to peer PE routers 18 in service provider network 10. Once primary PE router 16A re-advertises the routes, PE routers 18 in service provider network 10 will return to sending traffic destined for customer site 12A along the primary forwarding path through primary PE router 16A to CE router 14A. In some cases, however, primary PE router 16A may begin receiving data traffic from PE routers 18 destined for customer site 12A before the received routes have been installed in the forwarding plane of primary PE router 16A. This results in traffic loss, i.e., "black-holing," at primary PE router 16A while the backup forwarding path exists through backup PE router 16B.

The techniques of this disclosure reduce traffic loss for the re-established BGP session by delaying re-advertisement of the routes received from CE router 14A at primary PE router 16A until all the routes are installed in the forwarding plane of primary PE router 16A. As illustrated in FIG. 1, when CE router 14A is connected to primary PE router 16A and backup PE router 16B via a multi-homed network connection 15, traffic may continue to reach CE router 14A and customer site 12A via the backup forwarding path from PE routers 18 through backup PE router 16B during the re-advertisement delay at primary PE router 16A. In this way, the techniques avoid traffic loss, i.e., "black-holing," in which primary PE router 16A receives traffic on the routes received from CE router 14A before the routes have been installed in the forwarding plane of primary PE router 16A.

In some cases, the traffic black-holing issue may also be solved by applying a constant delay to BGP re-advertisements from primary PE router 16A to peer PE routers 18. The constant delay, however, may be too short or too long depending on the number of routes received from CE router 14A. Applying an appropriate length delay, therefore, requires user configuration at primary PE router 16A to adjust the delay time based on the number of routes from CE router 14A. In addition, re-advertisement delays would have to be configured separately for any routes received from other peer routers multi-homed to primary PE router 16A. The traffic black-holing issue may also be solved by implementing route acknowledgement messages (Route-ACKs) between PFEs in the forwarding plane and a routing engine in a control plane of primary PE router 16A to signal when each of the routes has been installed in the PFEs. Requiring Route-ACKs from each of the PFEs for each of the updated routes, however, presents a scalability issue.

Examples of techniques of this disclosure make use a BGP marker from multi-homed CE router 14 that indicates the end of a route download for each address family negotiated for the BGP session with primary PE router 16A. Conventionally, the BGP marker, i.e., an end-of-RIB marker, is used during graceful failover of primary PE router 16A to indicate when multi-homed CE router 14A has advertised all the routes in an address family. The number of address families negotiated for the BGP session is typically a small number, e.g., less than ten. In a graceful restart situation, multi-homed CE router 14A will send an end-of-RIB marker for each of the address families to indicate that all the routes for the particular address family have been downloaded. The end-of-RIB marker may also be used when graceful restart is not enabled for the BGP session.

Upon receiving the BGP marker from CE router 14A indicating that a route download for a given address family is complete, the routing engine of primary PE router 16A requests a Route-ACK from the PFEs of the forwarding plane for only the last route of the address family received from CE router 14A before the BGP marker. When the routing engine in primary PE router 16A receives the Route-ACK from the PFEs indicating that the last route has been installed in the PFEs, primary PE router 16A may assume that all the previous routes have also been installed in the PFEs of the forwarding plane. The receipt of the Route-ACK for the last route of the address family at the routing engine of primary PE router 16A initiates re-advertisement of the routes received from CE router 14A to peer PE routers 18.

In this way, the techniques implement an appropriate length re-advertisement delay at primary PE router 16A to avoid traffic loss using a reduced number of Route-ACKs. For example, the technique may reduce a number of Route-ACKs from millions to less than ten, i.e., one Route-ACK for each address family negotiated for the BGP session. More specifically, the techniques reduce or eliminate traffic loss in a router acting as the primary router, e.g., primary PE router 16A, in a multi-homed network connection when the router re-advertises routes received from a newly re-established multi-homed router, e.g., CE router 14A. In addition, stress on the Route-ACK machinery of the primary router does not increase proportional to the scale of the number of BGP routes received from the newly re-established multi-homed router. Instead, according to the techniques, the stress on the Route-ACK machinery stays proportional to the number of address families negotiated for the BGP session, which is typically a very small number, e.g., less than ten. Further, the techniques automatically adjust the re-advertisement delay time based on the scale of the number of routes received from the newly re-established multi-homed router, thus not delaying the re-advertisement of routes for too long or too short of a duration of time.

Figure 2:
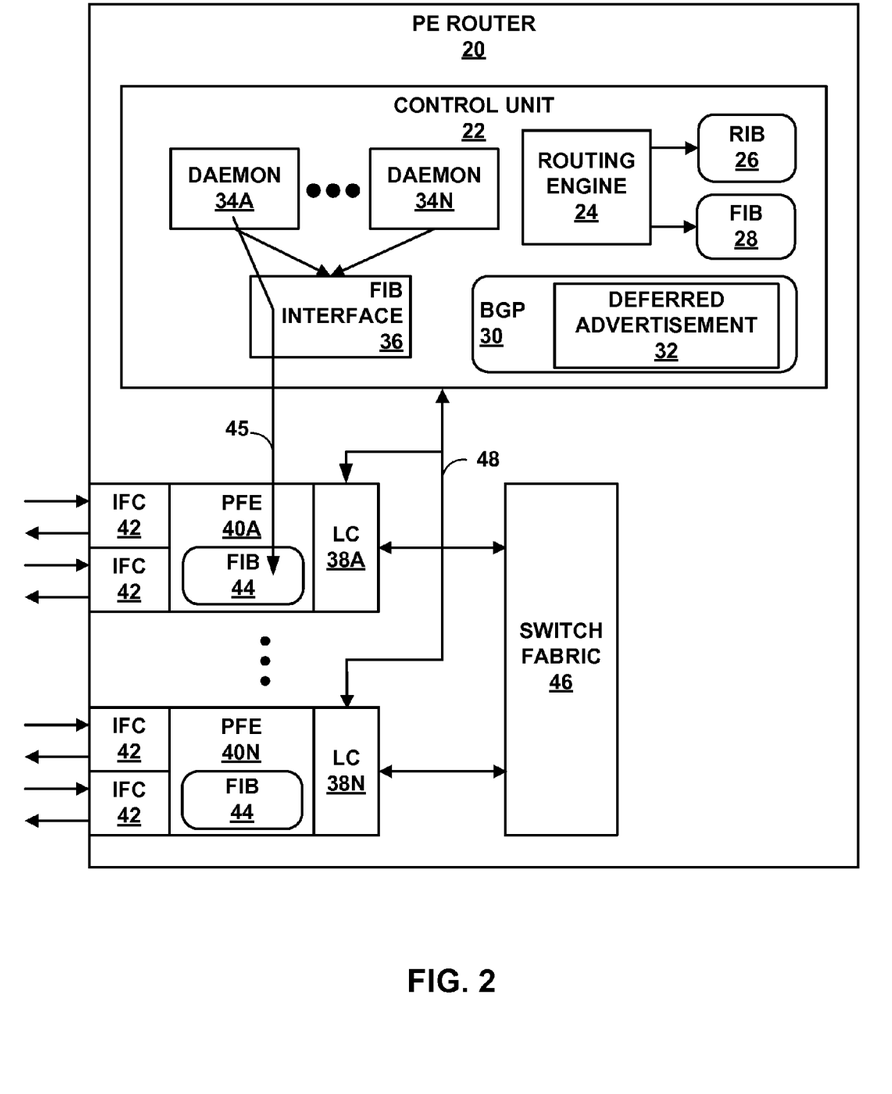
FIG. 2 is a block diagram illustrating a PE router configured to operate as a primary router in a multi-homed network connection in accordance with the techniques described herein.

FIG. 2 is a block diagram illustrating a PE router 20 configured to operate as a primary router in a multi-homed network connection in accordance with the techniques described herein. For example, PE router 20 may operate substantially similar to primary PE router 16A connected to multi-homed CE router 14A from FIG. 1.

In this example, PE router 20 includes control unit 22 that provides control plane functionality for the network device. PE router 20 also includes switch fabric 46 interconnecting a set of line cards 38A-38N ("LCs 38"), each of which includes at least one of packet-forwarding engines 40A-40N ("PFEs 40") that send and receive traffic by a set of interface cards 42 ("IFCs 42") that typically have one or more physical network interfaces (i.e., ports). LCs 38, components included in LCs 38, and switch fabric 46 collectively provide a forwarding plane for forwarding transit network traffic. Although not shown in FIG. 2, PFEs 40 may each comprise a central processing unit (CPU), memory and one or more programmable packet-forwarding application-specific integrated circuits (ASICs). Switch fabric 46 provides a high-speed interconnect for forwarding incoming data packets between PFEs 40 for transmission over a network.

Control unit 22 provides an operating environment for various protocols that perform control plane functions for PE router 20. For example, daemons 34A-34N ("daemons 34") comprise user-level processes that run network management software, execute routing protocols to communicate with peer routers, maintain and update one or more routing tables, and create one or more forwarding tables for installation to PFEs 40, among other functions. For example, one of daemons 34 may use BGP 30 as the control plane protocol for signaling a VPN service or other services offered by a service provider network, e.g., network 10 from FIG. 1, in order to transparently interconnect customer sites connected to the network.

As another example, one of daemons 34, e.g., a routing protocol daemon (RPD), may run on routing engine 24 to control L3 routing and L2 forwarding functions. In general, routing engine 24 maintains a routing information base (RIB) 26 storing L3 routing information that defines routes to destinations within the network and L2 topology data that represents the overall topology of the network. Based on RIB 26, routing engine 24 generates forwarding information base (FIB) 28 to contain forwarding data structures for installing within PFEs 40 in the forwarding plane. As illustrated in FIG. 2, each of PFEs 40 include FIB 44, which is a copy of FIB 28 in control unit 22, to associate network destinations with specific next hops and the corresponding interface ports within the forwarding plane.

In the example where PE router 20 participates in a VPN service, in addition to RIB 26, control unit 22 may store routing information in each of one or more virtual routing and forwarding (VRF) tables for the different VPNs supported by PE router 20. The routing information stored in the customer VRF tables may be leaked from a master VPN table. Only routes defined by forwarding data structures derived from the customer VRF tables are installed in FIBs 44 of PFEs 40.

In the example of FIG. 2, control unit 22 is connected to each of LCs 38 by a dedicated internal communication link 48. For example, dedicated link 48 may comprise a 200 Mbps or Gigabit Ethernet connection for internal communication between the multiple components of PE router 20. In one embodiment, control unit 22 communicates data representative of the software copy FIB 44 into PFEs 40 to program the PFEs 40 and thereby control forwarding of traffic by the corresponding components within the forwarding plane. This allows the software copy FIB 44 stored in memory (e.g., on-chip RAM) in each of PFEs 40 to be updated without degrading packet-forwarding performance of PE router 20. In some instances, control unit 22 may derive a separate and different software FIB for each of the respective PFEs 40. In addition, one or more of PFEs 40 may include packet-forwarding ASICs (not shown in FIG. 2) that PFEs 40 program with a hardware-copy FIB based on the software copy FIB 44 (i.e., hardware versions of the software FIBs) in each of the respective PFEs 40.

PFEs 40 process packets by performing a series of operations on each packet over respective internal packet forwarding paths as the packets traverse the internal architecture of PE router 20. Operations may be performed, for example, on each packet by any of a corresponding ingress interface, an ingress one of PFEs 40, an egress one of PFEs 40, an egress interface or other components of PE router 20 to which the packet is directed prior to egress. PFEs 40 each include forwarding data structures within FIB 44 that, when executed, examine the contents of each packet and on that basis make forwarding decisions, apply filters, and/or perform accounting, management, traffic analysis, and load balancing, for example. The result of packet processing determines the manner in which a packet is forwarded or otherwise processed by PFEs 40 from its ingress interface on one of IFCs 42 to its egress interface on one of IFCs 42.

Daemons 34 identify individual programs stored in control unit 22 for compilation and instantiation as forwarding data structures in FIBs 44 in order to apply functions designated by daemons 34 for the forwarding plane functionality of PE router 20. The programs may specify functions to be performed on the packet, including fundamental packet forwarding operations such as input packet processing, route lookup, and output packet processing, as well as service functions such as packet filtering or access control, statistical sampling, traffic policing, rate limiting, and accounting. For example, one of daemons 34 may execute BGP 30 and receive a message from a BGP peer that causes the daemon to trigger a particular BGP function defined by one of the programs. As another example, one of daemons 34 may execute a command line interface (CLI) that receives, from a user, a command to apply a policing function that is defined by one of the programs to rate limit a particular traffic flow at a particular rate.

Daemons 34 then invoke FIB interface 36 to select the appropriate forwarding data structure of the programs for installation to PFEs 40 in FIBs 44. FIB interface 36 presents an interface to PFEs 40 by which daemons 34 may communicate one or more forwarding data structures via internal communication link 45 for instantiation within FIBs 44 to establish packet forwarding paths and provide lookup data. FIB interface 36 may comprise one or more user- or kernel-level libraries, programs, toolkits, application programming interfaces (APIs). Additional information regarding packet forwarding path programming is available in PACKET FORWARDING PATH PROGRAMMING USING A HIGH-LEVEL DESCRIPTION LANGUAGE, U.S. application Ser. No. 13/194,571, filed Jul. 29, 2011, which is incorporated herein by reference in its entirety.

The operating environment of control unit 22 may be implemented solely in software, or hardware, or may be implemented as a combination of software, hardware or firmware. For example, control unit 22 may include one or more processors which execute software instructions. In that case, control unit 22 may include various software modules or daemons, e.g., daemons 34, executing on an operating system, and may include a non-transitory computer-readable storage device, such as computer memory or hard disk, for storing executable instructions.

The architecture of PE router 20 illustrated in FIG. 2 is shown for exemplary purposes only. The disclosure is not limited to this architecture. In other embodiments, PE router 20 may be configured in a variety of ways. In one embodiment, for example, some of the functionally of control unit 22 may be distributed within PFEs 40. Elements of control unit 22 may be implemented solely in software, or hardware, or may be implemented as combinations of software, hardware, or firmware. For example, control unit 22 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 22 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 20, e.g., protocols. Control unit 22, in some examples, retrieves and executes the instructions from memory for these aspects.

As described above, PE router 20 may comprise a primary router in a multi-homed network connection. For example, control unit 22 of primary PE router 20 may execute BGP 30 to maintain a BGP session with a multi-homed router. In this case, primary PE router 20 operates as the designated forwarder to send traffic on a primary forwarding path to the multi-homed router. Another PE router connected to the multi-homed router may operate as a backup router. When the BGP session between primary PE router 20 and the multi-homed router is down, the backup router will be used to send traffic on a backup forwarding path to the multi-homed router. Once the BGP session between primary PE router 20 and the multi-homed router is reestablished, PE router 20 reestablishes the primary forwarding path to the multi-homed router from other BGP peers of PE router 20.

After the BGP session with primary PE router 20 is reestablished, PE router 20 receives route advertisements for one or more BGP address families from the multi-homed router. Upon receiving the route advertisements, control unit 22 of PE router 20 executes routing engine 24 to update the routing information stored in RIB 26. After updating RIB 26 based on the received routes, routing engine 24 updates forwarding information, including forwarding data structures, stored in FIB 28 based on the routing information in updated RIB 26. Control unit 22 then updates FIBs 44 within PFEs 40 in the forwarding plane of PE router 20 based on the changes to FIB 28. As described above, daemons 34 invoke FIB interface 36 to install appropriate forwarding data structures into FIBs 44 of PFEs 40. In this way, packet forwarding paths through the forwarding plane of PE router 20 are reestablished for the received network routes to the multi-homed router.

Conventionally, immediately upon receiving the advertised routes, control unit 22 of PE router 20 may execute BGP to re-advertise the received routes to BGP peers in the network to reestablish the primary forwarding path. Once the routes are re-advertised, the BGP peer routers will begin sending traffic destined for the multi-homed router along the primary forwarding path through PE router 20. This immediate re-advertisement, however, may result in traffic loss, i.e., "black-holing," when PE router 20 receives traffic on the received routes before the routes have been installed in the forwarding plane of PE router 20. In the case of the multi-homed network connection, this traffic loss is avoidable because the traffic can continue to be forwarded to the multi-homed router on the backup forwarding path while the primary forwarding path is still being programmed.

According to the techniques of this disclosure, control unit 22 executes BGP 30 with a deferred advertisement extension 32 that defers re-advertisement of the routes received in an address-family to the BGP peers in the network until a last route of the address family for the BGP session is installed in the forwarding plane of PE router 20. By deferring the route re-advertisement until the last route is installed in the forwarding plane, control unit 22 ensures that all the received routes are installed in the forwarding plane of PE router 20 before receiving traffic destined for the multi-homed router on the received routes. During the deferred router re-advertisement, traffic may continue to be sent to the multi-homed router via the backup forwarding path. In this way, the techniques eliminate or reduce traffic loss for a BGP session due to black-holing in a multi-homed network connection.

In order to achieve an appropriate length re-advertisement delay and maintain scalability, the techniques utilize a BGP marker received from the multi-homed router that indicates the end of a route download for a given address family. Specifically, upon receiving the BGP marker, i.e., an end-of-RIB marker, from the multi-homed router indicating that a route download for the address family is complete, routing engine 24 of PE router 20 requests a Route-ACK from PFEs 40 in the forwarding plane for only the last route received from the multi-homed router before the BGP marker. In this way, routing engine 24 will receive an acknowledgement when the last route for the address family has been installed in PFEs 40 of the forwarding plane. Routing engine 24 may assume that, by the time the last route has been installed in PFEs 40, all the routes in the address family received previous to the last route have also been installed in PFEs 40.

In the example where PE router 20 participates in a VPN service and maintains one or more VRF tables for the different VPNs, only routes defined by forwarding data structures derived from a customer VRF table are installed in FIBs 44 of PFEs 40. In this case, routing engine 24 may request Route-ACKs only for routes of the customer VRF table that will be installed in FIBs 44. Routing engine 24, therefore, requests a Route-ACK for the last route of an address family that is also included in the customer VRF table and will be installed in FIBs 44 in the forwarding plane.

The receipt of the Route-ACK for the last route of the address family triggers re-advertisement of all the routes of the address family received from the multi-homed router to BGP peers in the network. In this way, the techniques reduce or eliminate traffic loss for a BGP session between primary PE router 20 and a newly re-established multi-homed router while using a minimum number of Route-ACK messages. In some cases, as a fallback measure, the wait time for routing engine 24 to receive the Route-ACK for the last route from the PFEs may time-out after a reasonable duration of time. In this case, the time-out may trigger the route re-advertisement.

Figure 3:
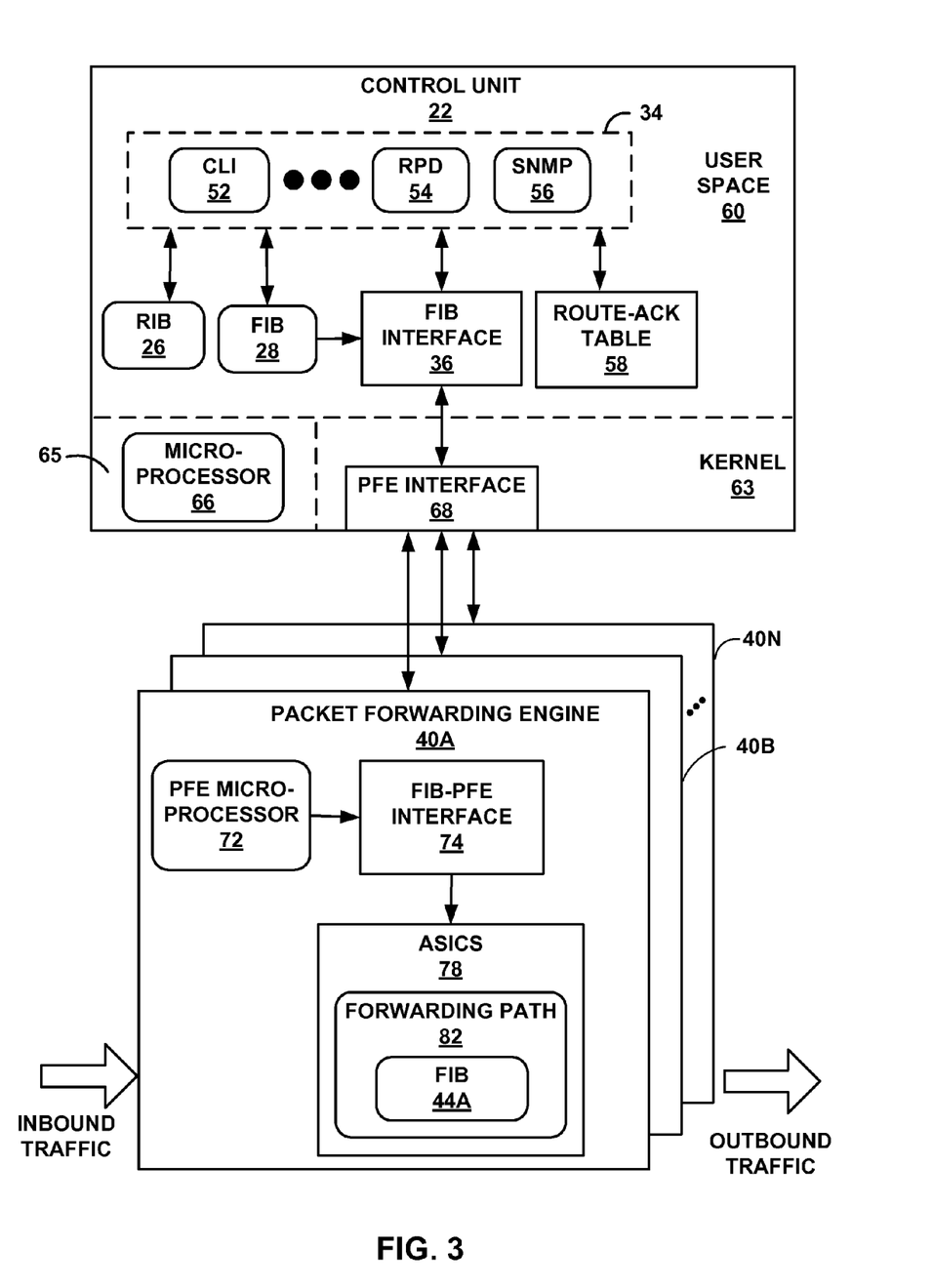
FIG. 3 is a block diagram illustrating the primary router from FIG. 2 in greater detail.

FIG. 3 is a block diagram illustrating components of the primary PE router 20 from FIG. 2 in greater detail. More specifically, FIG. 3 illustrates control unit 22 of a control plane and PFE 40A of the forwarding plane of PE router 20.

In the illustrated example, control unit 22 provides a control plane operating environment for execution of various user-level daemons 34 in user space 60. Daemons 34, in this example, include command-line interface daemon 52 ("CLI 52"), routing protocol daemon 54 ("RPD 54"), and Simple Network Management Protocol daemon 56 ("SNMP 56"). In other examples, control unit 22 may include additional daemons 34 not shown in FIG. 3 that perform other control, management, or service plane functionality and/or drive and otherwise manage data plane functionality for PE router 20.

RPD 54 executes one or more interior and/or exterior routing protocols to exchange routing information with other network devices, store received routing information in RIB 26, and store derived forwarding information in FIB 28. CLI 52 provides a shell by which an administrator or other management entity may modify the configuration of PE router 20 using text-based commands. SNMP 56 comprises an SNMP agent that receives SNMP commands from a management entity to set and retrieve configuration and management information for PE router 20. RPD 54, CLI 52, and SNMP 56 configure the forwarding plane to implement packet-forwarding services, add/modify/delete routes, and otherwise modify packet forwarding paths by installing forwarding structures in FIBs 44 of PFEs 40.

Daemons 34 operate over and interact with kernel 63, which provides a run-time operating environment for user-level processes. Kernel 63 may comprise, for example, a UNIX operating system derivative such as Linux or Berkeley Software Distribution (BSD). Kernel 63 offers libraries and drivers by which daemons 34 may interact with the underlying system. PFE interface 68 of kernel 63 comprises a kernel-level library by which daemons 34, FIB interface 36, and other user-level processes or user-level libraries may interact with PFEs 40. PFE interface 68 may include, for example, a sockets library for communicating with PFEs 40 over dedicated network links.

Hardware environment 65 of control unit 22 includes microprocessor 66 that executes program instructions in order to execute both kernel 63 and user space 60 of control unit 22. Microprocessor 66 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

As described above with respect to FIG. 2, FIB interface 36 allows daemons 34 to drive the installation and configuration of forwarding data structures in PFEs 40. In particular, FIB interface 36 includes an API by which daemons 34 may select an appropriate forwarding data structure for installation to PFEs 40, and communicate the forwarding data structure to PFEs 40 for installation to FIBs 44 as packet forwarding paths.

PFEs 40 implement forwarding plane functionality to handle packet processing from ingress interfaces on which packets are received to egress interfaces to which packets are sent. The forwarding plane determines data packet forwarding through PE router 20, applies packet-forwarding services, rate limits packet flows, filters packets, and otherwise processes the packets using forwarding data structures and lookup data installed by control unit 22 in PFEs 40. While FIG. 3 illustrates only PFE 40A in detail, each of PFEs 40 comprises similar components that perform substantially similar functionality.

The forwarding data structures define a forwarding path 82 for each incoming packet received by PE router 20. For example, a route table lookup forwarding data structure maps packet properties (e.g., destination information and other select information from a packet header) to one or more specific next hop routers and to one or more specific output interfaces based on route information. Forwarding path 82 may include, for example, executable instructions, programmable logic, and application-specific logic that perform lookups, rate limit packet flows, and other functions defined by the forwarding data structures. PFE 40A includes ASICs 78 that process packets to identify packet properties and perform actions associated with the properties. Forwarding path 82 comprises programmable, executable microcode and fixed hardware components that determine the packet processing actions and other operations performed by ASICs 78.

PFE microprocessor 72 manages ASICs 78 and executes FIB-PFE interface 74 to provide an interface to control unit 22. PFE microprocessor 72 may execute a microkernel to provide an operating environment for interfaces. FIB-PFE interface 74 is a programming interface that receives forwarding data structures from PFE interface 68 of control unit 22. The forwarding data structures are then installed in FIB 44A in ASIC 78 as a portion of forwarding path 82.

As described above, PE router 20 may comprise a primary router in a multi-homed network connection that operates as the designated forwarder to send traffic on a primary forwarding path to the multi-homed router. Another PE router connected to the multi-homed router may operate as a backup router. After a failure of a BGP session between primary PE router 20 and the multi-homed router, traffic may be sent on a backup forwarding path to the multi-homed router until the primary forwarding path is reestablished. Once the BGP session between primary PE router 20 and the multi-homed router is reestablished, PE router 20 reestablishes the primary forwarding path to the multi-homed router by re-advertising routes of the multi-homed router to other BGP peers of PE router 20.

The techniques of this disclosure reduce traffic loss for the BGP session between primary PE router 20 and the newly re-established multi-homed router by delaying reestablishment of the primary forwarding path until all the routes are updated in the forwarding plane of primary PE router 20. In order to delay reestablishment of the primary forwarding path, control unit 22 of PE router 20 defers re-advertising the routes received from the multi-homed router to the other BGP peers until a last route for a given address family is installed in the forwarding plane of PE router 20.

As described above with respect to FIG. 2, the techniques utilize a BGP marker, i.e., an end-of-RIB marker, received from the multi-homed router that indicates the end of a route download for a given address family. In response to receiving the BGP marker, RPD 54 triggers a Route-ACK for only the last route of the address family by using a route change mechanism. For example, when control unit 22 receives the BGP marker from the multi-homed router, RPD 54 executing in control unit 22 locates the last route installed in RIB 26 and issues a route change request with a set Route-ACK bit. In this way, RPD 54 directs a Route-ACK flag to set on the last route in RIB 26. The Route-ACK flag indicates that PFEs 40 will send a Route-ACK for the last route to control unit 22 once the route installation in the forwarding plane is complete. The deferred advertisement extension 32 of BGP protocol 30 remembers that a Route-ACK has been requested for the last route in an address-family, and delays re-advertisement of the address-family routes to other BGP peers until the last route is updated in the forwarding plane. The techniques of this disclosure utilize the end-of-RIB marker to identify the last route received for an address family in RIB 26, and defer re-advertisement of all the routes of the address family until the last route is installed in the forwarding plane.

RPD 54 uses FIB interface 36 to send the route change request to PFE interface 68 in kernel 63 for communication to PFEs 40. Kernel 63 generates a request for a Route-ACK for the last route of the address family to all PFEs 40 in the forwarding plane. Once the last route is installed in FIBs 44 of PFEs 40 via FIB-PFE interface 74, each of PFEs 40 sends a Route-ACK response back to kernel 63 via FIB-PFE interface 74 and PFE interface 68. Kernel 63 then consolidates the Route-ACK responses from all PFEs 40 and provides a single, consolidated Route-ACK response to RPD 54 indicating that the route has been updated in all PFEs 40 of the forwarding plane.

When kernel 63 generates the Route-ACK request for the last route, kernel 63 also generates a Route-ACK cookie for the routing engine. RPD 54 maintains a Route-ACK table 58 in control unit 22 that maintains a mapping between the route and the Route-ACK cookie until the consolidated Route-ACK response is received from kernel 63. When RPD 54 receives the Route-ACK response from kernel 63, an updated route change is indicated for the route associated with the Route-ACK cookie. RPD 54 looks-up the route associated with the Route-ACK cookie in route-ACK table 58, locates the route in RIB 26, and clears the Route-ACK flag set on the route in RIB 26. Once the Route-ACK flag is cleared for the last route in RIB 26, RPD 54 knows that the last route for the address family is installed in PFEs 40. RPD 54 may then assume that all the routes in the address family received previous to the last route have also been installed in PFEs 40. The receipt of the Route-ACK and clearing of the Route-ACK flag for the last route of the address family triggers re-advertisement of the routes for the address family to the BGP peers in the network.

Figure 4:
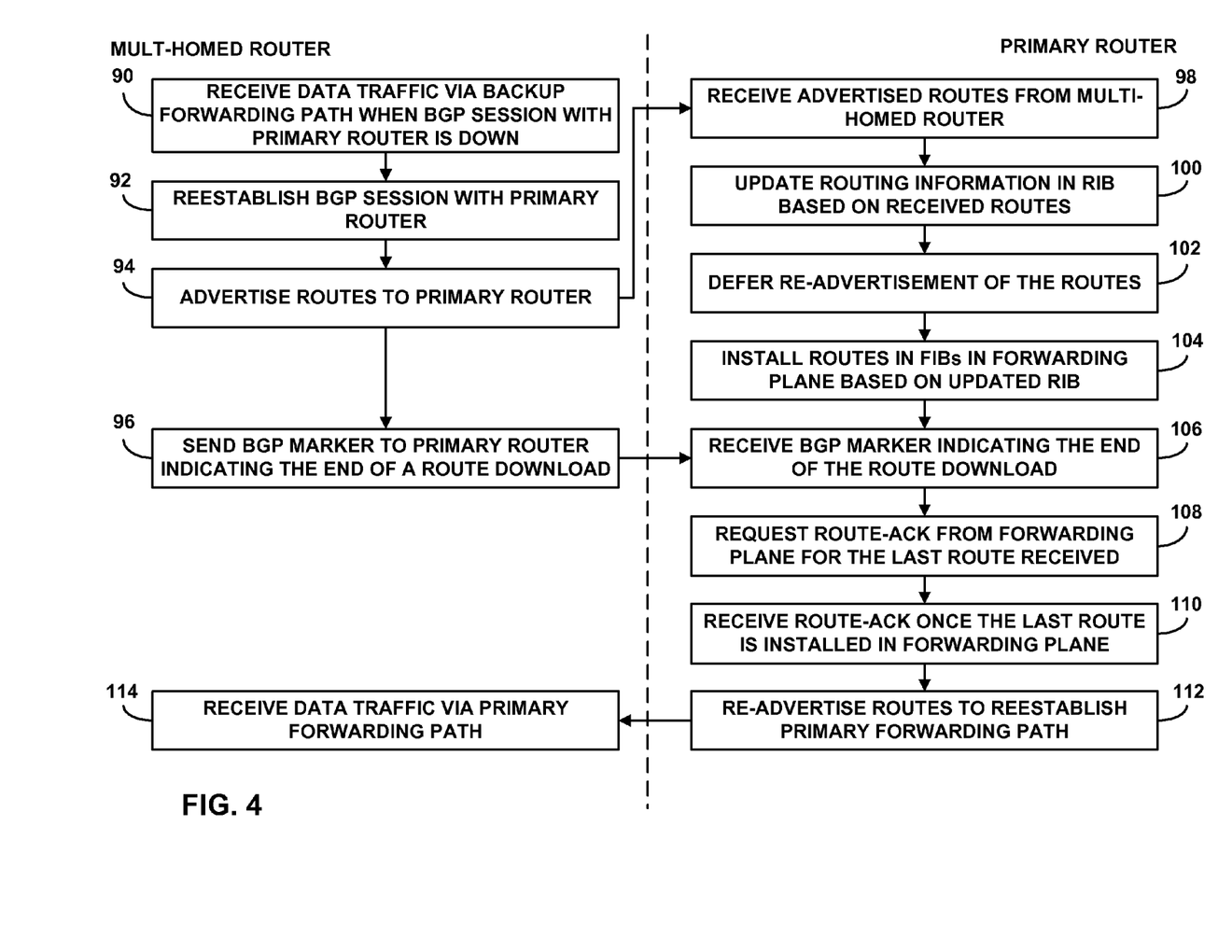
FIG. 4 is a flow chart illustrating example operations of a multi-homed router and a primary router in a multi-homed network connection consistent with techniques described in this disclosure.

FIG. 4 is a flow chart illustrating example operations of a multi-homed router and a primary router in a multi-homed network connection consistent with techniques described in this disclosure. For illustrative purposes, the operations are discussed as being performed by a multi-homed CE router, e.g., CE router 14A from FIG. 1, and a primary PE router, e.g., PE router 16A from FIG. 1. It should be understood, however, that other routers or network devices may also implement the example operations.

As described above, in the active-standby link topology illustrated in FIG. 1, primary PE router 16A is the designated forwarder to send traffic to and from customer site 12A. The other backup PE router 16B is the backup forwarder, which can be used to send traffic to and from customer site 12A in the event of a network failure that would preclude primary PE router 16A from sending the traffic. In this case, a primary forwarding path through network 10 exists to send traffic from any of customer sites 12B-12D to customer site 12A via PE routers 18, primary PE router 16A, and CE router 14A. In addition, a backup forwarding path through network 10 exists between customer sites 12B-12D and customer site 12A via PE routers 18, backup PE router 16B, and CE router 14A.

When the BGP session between primary PE router 16A and CE router 14A goes down, multi-homed CE router 14A receives traffic for customer site 12A via the backup forwarding path through backup PE router 16B (90). Multi-homed CE router 14A then reestablishes the BGP session with primary PE router (92). Once the BGP session is reestablished, multi-homed CE router 14A advertises its routes to primary PE router 16A (94).

Primary PE router 16A receives the routes advertised by multi-homed CE router 14A (98). Upon receiving the advertised routes, a control unit within primary PE router 16A updates routing information stored in a RIB based on the received routes (100). The control unit of primary PE router 16A also derives a FIB that includes a number of forwarding data structures in accordance with the routing information in the updated RIB. According to the techniques of this disclosure, primary PE router 16A defers re-advertisement of the routes to its BGP peers, e.g., PE routers 18 in service provider network 10 (102). If primary PE router 16A immediately re-advertises the routes, primary PE router 16A may begin receiving data traffic destined for multi-homed CE router 14A of customer site 12A before the received routes have been installed in the forwarding plane of primary PE router 16A. This results in traffic loss, i.e., "black-holing," at primary PE router 16A. By deferring the route re-advertisement, the data traffic may continue to be sent over the backup forwarding path until the routes are updated in the forwarding plane of primary PE router 16A.

After the RIB and FIB are updated in the control plane, the control unit of primary PE router 16A then installs the routes in copies of FIBs within the forwarding plane of primary PE router 16A based on the updated RIB in the control plane (104). For example, the control unit of primary PE router 16A may install forwarding data structures for the routes into copies of FIBs in the PFEs of the forwarding plane in PE router 16A.

Once multi-homed CE router 14A advertises the last route for a given address family, multi-homed CE router 14A sends a BGP marker to primary PE router 16A indicating the end of the route download for the address family (96). Primary PE router 16A receives the BGP marker, e.g., an end-of-RIB marker, indicating the end of the route download for the address family (106). Upon receiving the BGP marker, the routing engine of primary PE router 16A requests a Route-ACK from the forwarding plane for only the last route of the address family received from multi-homed CE router 14A before the BGP marker (108).

In accordance with the techniques of this disclosure, the routing engine of primary PE router 16A triggers a Route-ACK for only the last route of the address family by using a route change mechanism. For example, when the routing engine of primary PE router 16A receives the BGP marker from multi-homed CE router 14A, the routing engine of primary PE router 16A locates the last route installed in the RIB and issues a route change with a Route-ACK bit set. In this way, a Route-ACK flag will be set on the last route in the RIB indicating that PFEs will send a Route-ACK for the route to the control unit before re-advertising the route. The route change request is then sent to the kernel of primary PE router 16A, and the kernel generates the request for the Route-ACK for the last route to all the PFEs in the forwarding plane.

The routing engine of primary PE router 16A then receives the Route-ACK from the forwarding plane once the last route of the address family has been installed in the forwarding plane (110). For example, the kernel consolidates the responses from all the PFEs in the forwarding plane and provides a single, consolidated Route-ACK indicating that the last route has been installed in all the PFEs of the forwarding plane. When the kernel requests a Route-ACK, the kernel also generates a Route-ACK cookie for the routing engine. The routing engine maintains a mapping between the route and the Route-ACK cookie until the consolidated Route-ACK is received from the kernel. When the routing engine receives the Route-ACK from the kernel, an updated route change is indicated for the last route. The routing engine determines the last route using the Route-ACK cookie, locates the last route in the RIB, and clears the Route-ACK flag associated with the last route in the RIB.

Once the last route has been installed in the forwarding plane, the control unit of primary PE router 16A may assume that all the previous routes of the address family have also been installed in the forwarding plane. Upon receiving the Route-ACK for the last route, primary PE router 16A re-advertises the routes to peer PE routers 18 to reestablish the primary forwarding path through network 10 (112). In some cases, as a fallback measure, the wait time for the routing engine to receive a Route-ACK from the forwarding plane may time-out after a reasonable duration of time, and the time-out may trigger the route re-advertisement.

According to the techniques, primary PE router 16A receives data traffic destined for multi-homed CE router 14A of customer site 12A only after the received routes have been installed in the forwarding plane of primary PE router 16A. Multi-homed CE router 14A then receives the traffic via the primary forwarding path through primary PE router 16A (114). In this way, the techniques reduce or eliminate traffic loss at primary PE router 16A when the router re-advertises routes received from a newly re-established BGP peer, e.g., CE router 14A.

Various embodiments have been described. These and other embodiments are within the scope of the following claims.

The invention claimed is:

1. A method comprising:
   receiving, with a primary router, one or more routes included in a set of routes advertised by a multi-homed router via a Border Gateway Protocol (BGP) session, wherein the multi-homed router is connected to the primary router and a backup router;
   updating, in a control plane of the primary router, routing information in a routing table based on the received routes;
   initiating, in a forwarding plane of the primary router, installation of forwarding data structures for the received routes in forwarding tables based on the routing information;
   receiving, with the primary router from the multi-homed router, a BGP marker identifying one of the routes received just before the BGP marker as a last route in the set of routes;
   in response to receiving the BGP marker, requesting, with the control plane of the primary router, an acknowledgement from the forwarding plane of the primary router indicating that the one of the routes identified as the last route in the set of routes is installed in the forwarding tables of the forwarding plane of the primary router; and
   during installation of the forwarding data structures, deferring, in the control plane of the primary router, re-advertisement of all of the routes in the set of routes to BGP peer routers until the control plane of the primary router receives the acknowledgement from the forwarding plane of the primary router.

2. The method of claim 1, further comprising, upon receiving, with the control plane, the acknowledgement from the forwarding plane indicating that the last route in the set of routes is installed in the forwarding tables of the forwarding plane, re-advertising all of the routes in the set of routes to the BGP peer routers.

3. The method of claim 1, further comprising:
   in response to receiving the BGP marker, issuing, with the control plane, a route change request to the forwarding plane for the last route in the set of routes.

4. The method of claim 3, wherein issuing the route change request for the last route in the set of routes comprises:
   locating the last route in the set of routes in the routing table in the control plane;
   setting an acknowledgment flag associated with the last route in the set of routes in the routing table;
   sending the route change request for the last route in the set of routes to a kernel of the primary router;
   requesting, with the kernel, the acknowledgement from the forwarding plane indicating that the last route is installed in the forwarding tables of the forwarding plane;
   receiving, with the kernel, the acknowledgement from the forwarding plane when the last route in the set of routes has been installed in the forwarding tables of the forwarding plane; and
   upon receiving the acknowledgement, clearing the acknowledgment flag from the routing table in the control plane, wherein clearing the acknowledgment flag triggers re-advertisement of all of the routes in the set of routes to the BGP peer routers.

5. The method of claim 1, further comprising:
   in response to receiving the BGP marker, generating, with a kernel of the primary router, an acknowledgement request for the acknowledgement from the forwarding plane indicating that the last route in the set of routes is installed in the forwarding tables of the forwarding plane and an acknowledgment cookie associated with the acknowledgment request;
   mapping, in the control plane, the acknowledgement cookie to the last route in the set of routes; and upon receiving the acknowledgement from the forwarding plane in response to the acknowledgment request, identifying the last route in the set of routes based on the acknowledgment cookie associated with the acknowledgment request.

6. The method of claim 1, wherein the set of routes advertised by the multi-homed router comprises an address family negotiated for the BGP session, further comprising receiving, with the primary router, routes included in one or more other sets of routes of one or more other address families negotiated for the BGP session, and, for each of the other address families, receiving another BGP marker identifying one of the routes received just before the another BGP marker as a last route in the respective set of routes of the respective address family.

7. The method of claim 1, further comprising reestablishing the BGP session between the primary router and the multi-homed router after a failure of the BGP session.

8. The method of claim 1, wherein deferring re-advertisement of all of the routes in the set of routes to BGP peer routers comprises executing a BGP protocol in the control plane of the primary router with a deferred advertisement extension.

9. The method of claim 1, wherein, during the deferred re-advertisement of all of the routes in the set of routes at the primary router, traffic is sent to the multi-homed router via the backup router.

10. A primary router in a multi-homed network connection, the primary router comprising:
one or more interfaces configured to receive one or more routes included in a set of routes advertised by the multi-homed router via a Border Gateway Protocol (BGP) session, wherein the multi-homed router is connected to the primary router and a backup router, and receive a BGP marker identifying one of the routes received lust before the BGP marker as a last route in the set of routes; and
a control unit configured to update routing information in a routing table in a control plane of the primary router based on the received routes, initiate installation of forwarding data structures for the received routes in forwarding tables in a forwarding plane of the primary router based on the routing information, in response to receiving the BGP marker, request an acknowledgement from the forwarding plane of the primary router indicating that the one of the routes identified as the last route in the set of routes is installed in the forwarding tables of the forwarding plane of the primary router, and during installation of the forwarding data structures, defer re-advertisement of all of the routes in the set of routes to BGP peer routers until the control plane of the primary router receives the acknowledgement from the forwarding plane of the primary router.

11. The primary router of claim 10, wherein, upon receiving the acknowledgement from the forwarding plane indicating that the last route in the set of routes is installed in the forwarding tables of the forwarding plane, the control unit re-advertises all of the routes in the set of routes to the BGP peer routers.

12. The primary router of claim 10, wherein:
in response to receiving the BGP marker, the control unit issues a route change request to the forwarding plane for the last route in the set of routes.

13. The primary router of claim 12,
wherein the control unit locates the last route in the set of routes in the routing table in the control plane, sets an acknowledgment flag associated with the last route in the set of routes in the routing table, and sends the route change request for the last route in the set of routes to a kernel of the primary router;
wherein the kernel requests the acknowledgement from the forwarding plane indicating that the last route in the set of routes is installed in the forwarding tables of the forwarding plane, and receives the acknowledgement from the forwarding plane when the last route in the set of routes has been installed in the forwarding tables of the forwarding plane; and
wherein, upon receiving the acknowledgement with the kernel, the control unit clears the acknowledgment flag from the routing table in the control plane and triggers re-advertisement of all of the routes in the set of routes to the BGP peer routers.

14. The primary router of claim 12, further comprising a kernel configured to, in response to receiving the BGP marker, generate an acknowledgement request for the acknowledgement from the forwarding plane indicating that the last route in the set of routes is installed in the forwarding tables of the forwarding plane and an acknowledgment cookie associated with the acknowledgment request, wherein the control unit maps the acknowledgement cookie to the last route in the set of routes, and, upon receiving the acknowledgement from the forwarding plane in response to the acknowledgment request, identifies the last route in the set of routes based on the acknowledgment cookie associated with the acknowledgment request.

15. The primary router of claim 12, wherein the set of routes advertised by the multi-homed router comprises an address family negotiated for the BGP session, and wherein the one or more interfaces receive routes included in one or more other sets of routes of one or more other address families negotiated for the BGP session, and, for each of the other address families, receive another BGP marker identifying one of the routes received just before the another BGP marker as a last route in the respective set of routes of the respective address family.

16. The primary router of claim 12, wherein the control unit reestablishes the BGP session between the primary router and the multi-homed router after a failure of the BGP session.

17. The primary router of claim 12, wherein the control unit executes a BGP protocol with a deferred advertisement extension in order to defer re-advertisement of all of the routes in the set of routes to the BGP peer routers.

18. The primary router of claim 12, wherein, during the deferred re-advertisement of all of the routes in the set of routes at the primary router, traffic is sent to the multi-homed router via the backup router.

19. A non-transitory computer-readable medium comprising instructions that when executed cause a processor of a primary router to:
receive one or more routes included in a set of routes advertised by a multi-homed router via a Border Gateway Protocol (BGP) session, wherein the multi-homed router is connected to the primary router and a backup router, and;
update, in a control plane of the primary router, routing information in a routing table based on the received routes;
initiate, in a forwarding plane of the primary router, installation of forwarding data structures for the received routes in forwarding tables based on the routing information;

receive, with the primary router from the multi-homed router, a BGP marker identifying one of the routes received lust before the BGP marker as a last route in the set of routes;

in response to receiving the BGP marker, request, with the control plane of the primary router, an acknowledgement from the forwarding plane of the primary router indicating that the one of the routes identified as the last route in the set of routes is installed in the forwarding tables of the forwarding plane of the primary router; and during installation of the forwarding data structures, defer, in the control plane of the primary router, re-advertisement of all of the routes in the set of routes to BGP peer routers until the control plane of the primary router receives the acknowledgement from the forwarding plane of the primary router.

20. The non-transitory computer-readable medium of claim 19, further comprising instructions that cause the processor to, upon receiving the acknowledgement from the forwarding plane indicating that the last route in the set of routes is installed in the forwarding tables of the forwarding plane, re-advertise all of the routes in the set of routes to the BGP peer routers.

21. The non-transitory computer-readable medium of claim 19, further comprising instructions that cause the processor to:

in response to receiving the BGP marker, issue, with the control plane, a route change request to the forwarding plane for the last route in the set of routes.

22. The non-transitory computer-readable medium of claim 21, wherein the instructions further cause the processor to:

locate the last route in the set of routes in the routing table in the control plane;

set an acknowledgment flag associated with the last route in the set of routes in the routing table;

send the route change request for the last route in the set of routes to a kernel of the primary router;

request, with the kernel, the acknowledgement from the forwarding plane indicating that the last route in the set of routes is installed in the forwarding tables;

receive, with the kernel, the acknowledgement from the forwarding plane when the last route has been installed in the forwarding tables of the forwarding plane; and upon receiving the acknowledgement, clear the acknowledgment flag from the routing table in the control plane, wherein clearing the acknowledgment flag triggers re-advertisement of all of the routes in the set of routes to the BGP peer routers.

23. The non-transitory computer-readable medium of claim 19, further comprising instructions that cause the processor to:

in response to receiving the BGP marker, generate, with a kernel of the primary router, an acknowledgement request for the acknowledgement from the forwarding plane indicating that the last route in the set of routes is installed in the forwarding tables of the forwarding plane and an acknowledgment cookie associated with the acknowledgment request;

map, in the control plane, the acknowledgement cookie to the last route in the set of routes; and upon receiving the acknowledgement from the forwarding plane in response to the acknowledgment request, identify the last route in the set of routes based on the acknowledgment cookie associated with the acknowledgment request.

* * * * *